Figure 1:
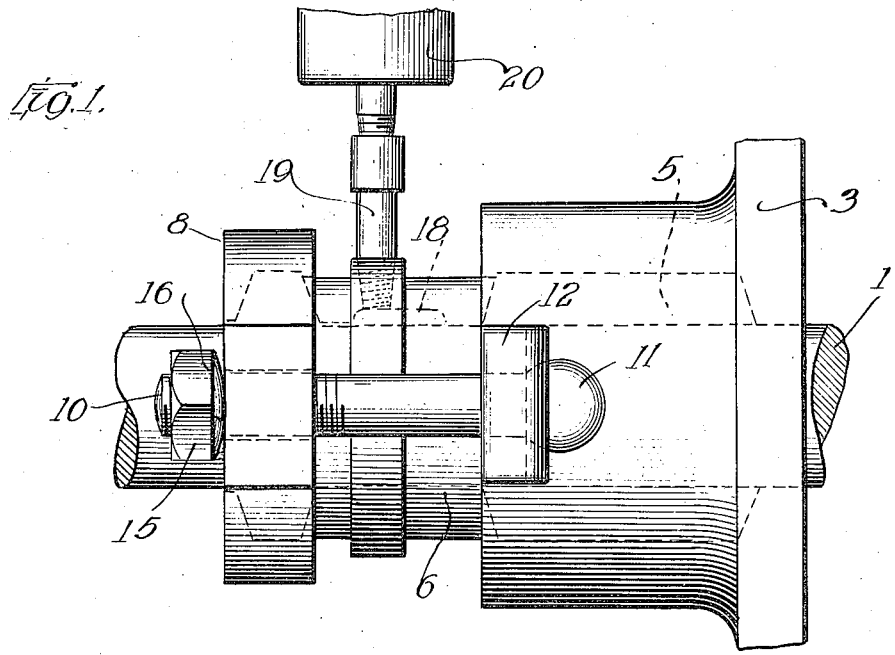

July 31, 1923. 1,463,365

H. E. LA BOUR

MEANS FOR PACKING ROTATING SHAFTS AND THE LIKE

Filed Feb. 24, 1921

Witnesses
Harry R. White
W. P. Kilroy

Inventor
Harry E. LaBour
by Brown, Bowen & Dunne
Attys.

Patented July 31, 1923.

1,463,365

UNITED STATES PATENT OFFICE.

HARRY E. LA BOUR, OF CHICAGO, ILLINOIS.

MEANS FOR PACKING ROTATING SHAFTS AND THE LIKE.

Application filed February 24, 1921. Serial No. 447,609.

*To all whom it may concern:*

Be it known that I, HARRY E. LA BOUR, a citizen of the United States, residing at Chicago, in the county of Cook and State of Illinois, have invented a certain new and useful Improvement in Means for Packing Rotating Shafts and the like, of which the following is a full, clear, concise, and exact description, reference being had to the accompanying drawings, forming a part of this specification.

My invention relates to means for packing rotating shafts and the like, more particularly to means for forming a fluid tight joint between a rotating shaft and a casing or the like through which the shaft projects.

The combination customarily used for this purpose consists of a box into which the packing proper is introduced and a gland by which the packing is compressed and held in place. Heretofore, it has not only been impossible to prevent fluid leakage along the shaft under all conditions, but this leakage has been commonly so great that the results secured have been most unsatisfactory. I find that such leakage is due primarily to the fact that in practice it is practically impossible to provide a shaft that will run perfectly true, or in other words, to provide a shaft having an absolutely true center or axis of rotation throughout its length. Since the packing is rigidly or fixedly held by the casing or stuffing box, any eccentricity in the shaft will make an opening through the packing larger than the diameter of the shaft itself. Consequently, the packing does not pack or bear uniformly on the shaft and leakage results. The resiliency of the packing material itself will not compensate for such eccentricity particularly when the speed of rotation of the shaft is fairly high.

While such leakage can be cured by the provision of an absolutely true center or axis of rotation throughout the length of the shaft, such a provision is, at least to all practical purposes, not feasible.

I have found that I can minimize or even entirely stop such leakage along the shaft by the provision of leakage preventing means having tight uniform contact with the casing or stuffing box through which the shaft projects; independent tight uniform contact with the shaft itself; and an intermediate flexible or yieldable portion between the two contacting portions.

While the aforesaid features are the only pre-requisites necessary to the successful carrying out of my invention, the leakage preventing means, which I now consider to be the preferred embodiment of the invention comprises a gland and a suitable packing having tight uniform contact with the casing or stuffing box, independent tight uniform contact with the shaft itself and a flexible intermediate portion, free to yield to the excursions of the shaft and any eccentricities or irregularities in the running thereof. The gland is free to follow the excursions of the shaft, that is, it is free to move laterally with respect to the shaft to swing with the rotations of the shaft and any eccentricities or irregularities in the running thereof.

Figure 2:
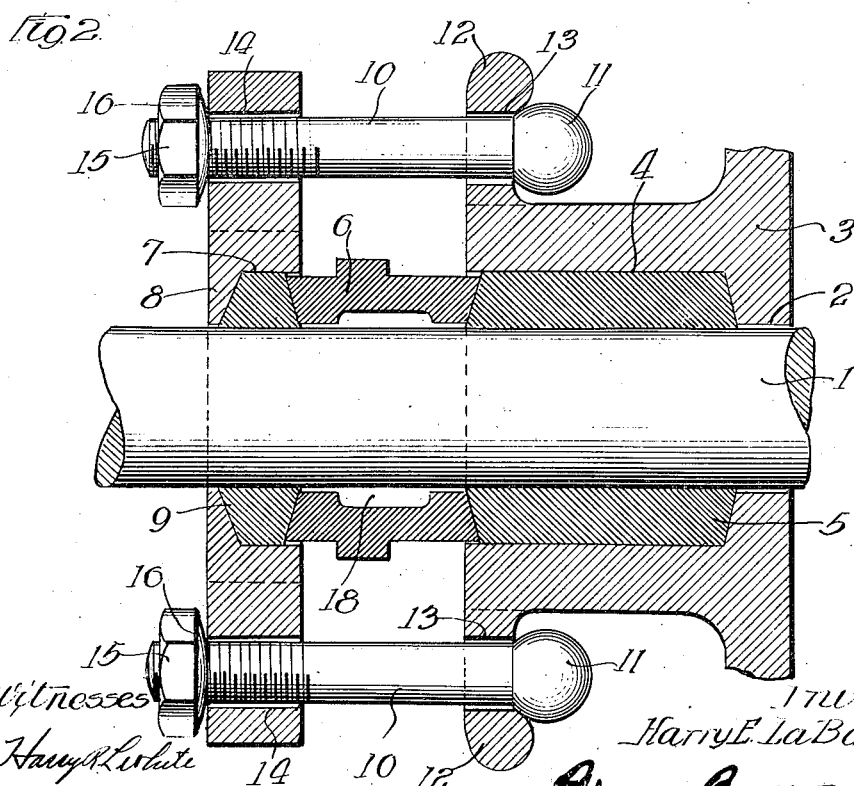

In order that those skilled in the art may be fully acquainted with the nature and scope of my invention, I shall describe a specific embodiment of the invention in connection with the accompanying drawings, in which:

Figure 1 is a front elevational view of a packing arrangement embodying my invention showing a fragment of the casing through which the shaft packed thereby projects; and Figure 2 is a horizontal sectional view taken substantially on the line 2—2 of Figure 1.

Before proceeding with the detailed description, I wish to point out that while my invention is particularly adapted for packing rotating shafts, the leakage preventing means provided is free to follow any lateral excursions of the movable element to maintain a fluid tight joint thereabout under all conditions whether the movable element be a rotating shaft or a reciprocating rod. I do not, therefore intend to limit the invention to a particular use or purpose, nor to the details of the particular embodiment shown.

Referring now to the drawings, the shaft 1 projects through a bore or opening 2 provided in the casing 3. The casing 3 is recessed or counterbored as shown at 4 to form a stuffing or packing box in which a quantity of suitable packing 5 is placed around the shaft 1 and in contact with it and the casing 3.

One end of a gland ring or sleeve 6 surrounding the shaft 1 enters the stuffing box 4 and contacts the packing 5. The internal bore of this gland ring or spacer 6 is such that the ring fits fairly close to the shaft 1. The outer dimension of the gland ring 6 is such that the end of the ring will enter the box 4 preferably with a slight clearance between it and the casing 3, the purpose of which clearance will be hereinafter apparent. The opposite end of the ring 6 enters a box or a recess 7 formed in the opposing face of a gland plate 8, through which plate the shaft 1 projects and contacts the packing 9 lodged therein. The packing 9 is arranged snugly about the shaft 1 and in snug contact with the gland plate 8. A slight clearance is provided between the interior of the box 7 and the sleeve 6 substantially as provided between the opposite end of the sleeve and the interior of the box 4.

It will now be apparent that by drawing the gland plate 8 up toward the casing 3 (to the right in the drawings) pressure will be produced simultaneously upon both of the packings 5 and 9 compressing these packings to cause them to tightly pack or seize the shaft 1 in the casing 3 and gland plate 8 respectively without interfering with the proper rotation of the shaft. The packing material employed may be of any suitable or preferred character. The gland plate 8 is drawn up and held in place by a pair of gland bolts 10. These gland bolts 10 extend through openings 13 in a pair of lugs or wings 12 projecting radially from the casing or boss 3, their spherical headed ends 11 cooperating with such lugs or wings 12 to permit free swiveling of the bolts in all directions about their connection with the casing 3. The shanks of the bolts 10 continue on through aligned openings 14 in the gland plate 8, their outer threaded ends engaging in nuts 15 by means about which the gland is readily manipulated to adjust or compress the packings 5 and 9 and to hold the same in place. The faces of the nuts 15 which engage the gland plate 8 are preferably rounded as shown at 16, to minimize, with the swivel connection between the opposite ends of the bolts 10 and the lugs or wings 12, the inertia of the gland and provide maximum freedom of motion of the same laterally with respect to the shaft.

It will now be apparent that while an eccentricity or irregularity in the running of the shaft 1 may make an opening through the packing 5 larger than the diameter of the shaft itself, such irregularity will not affect the tight contact between the packing 5 and the casing 3 other than to increase the tightness of the joint therebetween. Leakage, however, by reason of the increased diameter of the opening through the packing 5 is effectively prevented by the snug contact between the packing 9 and the shaft 1 which contact, together with the compression of the packing 5 is maintained by the gland ring 6. The eccentricity or irregularity in the running of the shaft instead of increasing the diameter of the opening through the packing 9 will cause such packing, with the gland plate 8 carrying it, to swing laterally with the eccentricity or irregularity, through the floating or swivel connection with the casing 3, the packing 9 maintaining its tight engagement with the shaft 1 throughout the various excursions of the shaft. Consequently, by means of the fluid tight joint between the packing 5 and the casing 3, together with the fluid tight joint between the packing 9 and the shaft 1 and the flexibility provided between such joints, which flexibility permits the gland plate 8 to follow the excursions of the shaft with the packing 9 in secure engagement with the shaft throughout such excursions, I have provided for effectively preventing leakage along the shaft, in this particular instance from the casing 3.

In the drawings, I have shown means for delivering lubricant to the annular space between the gland ring 6 and the shaft 1 to lubricate the shaft and the packings 5 and 9. Such lubrication still further opposes leakage along the shaft. The means illustrated consists of a tapped bore extending radially through the ring 6, the inner end of which bore communicates with the annular space 18 between the shaft 1 and the ring 6. A tube 19 threaded into this radial tapped bore communicates with a lubricant well or cup 20 into which a suitable lubricant may be introduced as desired. Upon delivery to the space 18, the lubricant will work along the shaft 1 in opposite directions to the packings 5 and 9.

I have operated a centrifugal pump having a shaft packed in accordance with my invention continuously for a number of days and find that the leakage is reduced to a minimum not attained heretofore.

The gland of my invention can be quickly applied and removed. There are no parts subject to appreciable wear and its life is therefore long.

I claim:

In combination, a casing having an annular outwardly projecting boss counterbored to provide an internal annular chamber, a shaft extending axially through said chamber, a packing fixed in said chamber and about said shaft against movement with excursions of the shaft, a gland plate bored to permit extension of the shaft therethrough, and counterbored from its casing face to receive a second packing about the shaft, a pair of diametrically opposite lugs formed integral with and projecting radially from the outer end of the casing boss, a pair of gland bolts extending through aligned openings in the gland plate and said lugs, said bolts having ball heads cooperating with said lugs and engaging at their outer ends in nuts having rounded surfaces cooperating with the gland plate, a gland ring loosely encircling the shaft between said first and second packings and bearing at its opposite ends against said packings, said gland ring having an internal annular recess between its ends and an external annular enlargement, and means for delivering a lubricant to said internal annular recess, said lubricant delivering means comprising a tube threaded into the external annular enlargement of said ring, and a reservoir connected to said tube.

In witness whereof I hereunto subscribe my name this 19th day of February 1921.

HARRY E. LA BOUR.